July 10, 1956     O. L. CUNNINGHAM, JR., ET AL     2,753,674
GANG MOWER
Filed Oct. 5, 1953     4 Sheets-Sheet 1
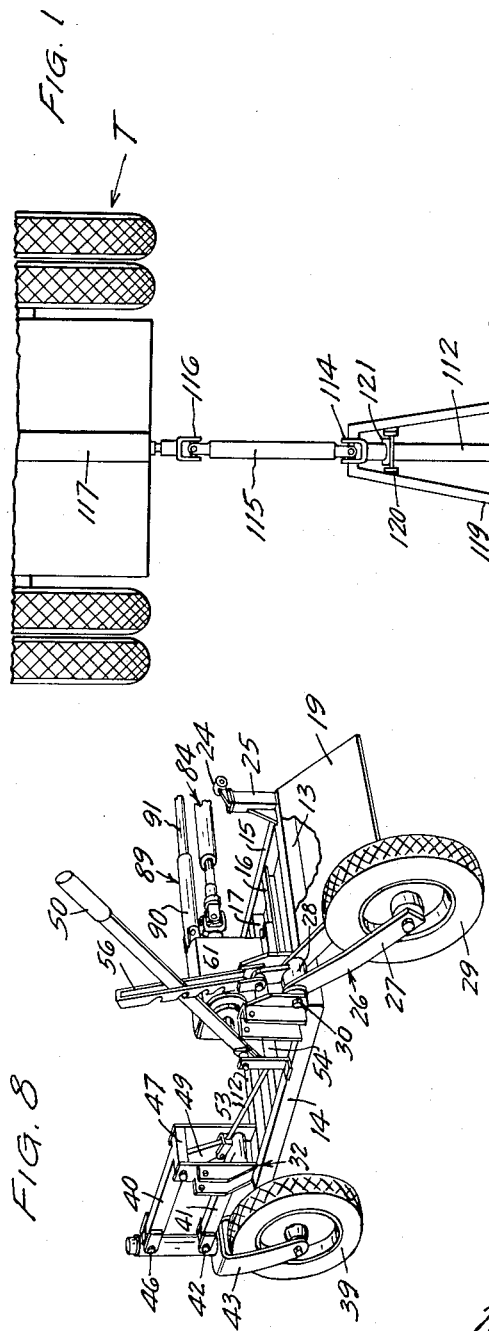
INVENTORS
OMAR L. CUNNINGHAM, JR.
WILLIAM F. MILLER
BY
Williamson, Williamson Schroeder & Adams
ATTORNEYS

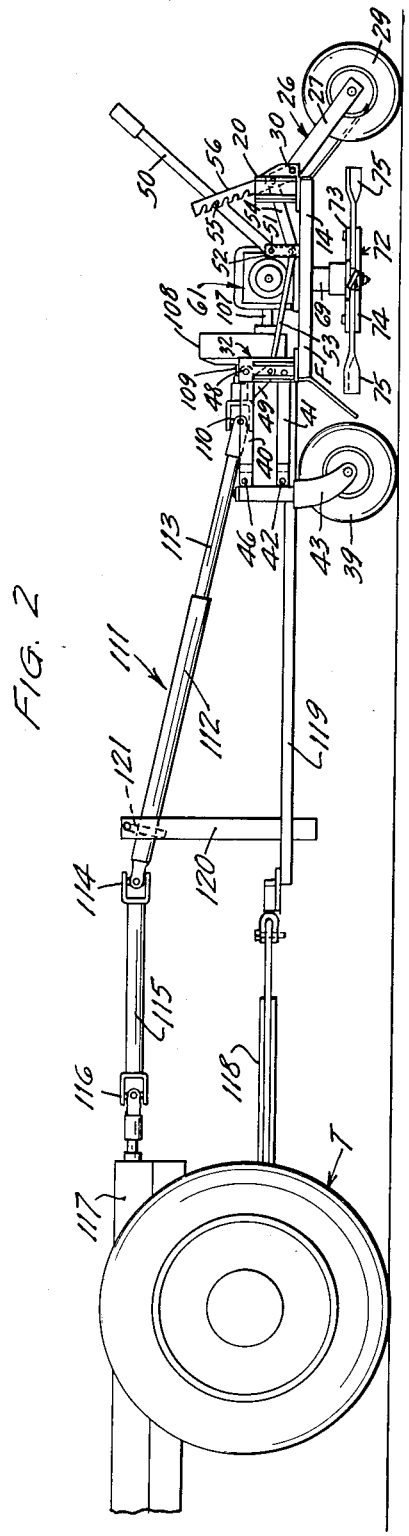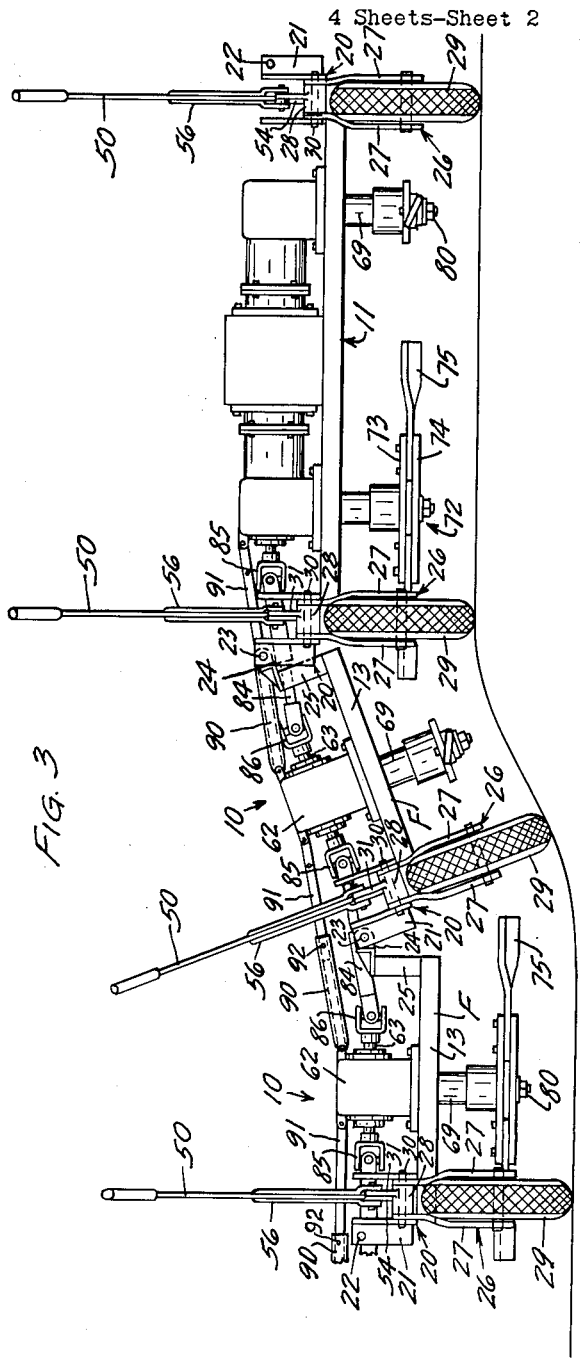

July 10, 1956  O. L. CUNNINGHAM, JR., ET AL  2,753,674
GANG MOWER

Filed Oct. 5, 1953  4 Sheets-Sheet 3

INVENTORS
OMAR L. CUNNINGHAM, JR.
WILLIAM F. MILLER
BY
Williamson, Williamson, Schroeder & Adams
ATTORNEYS

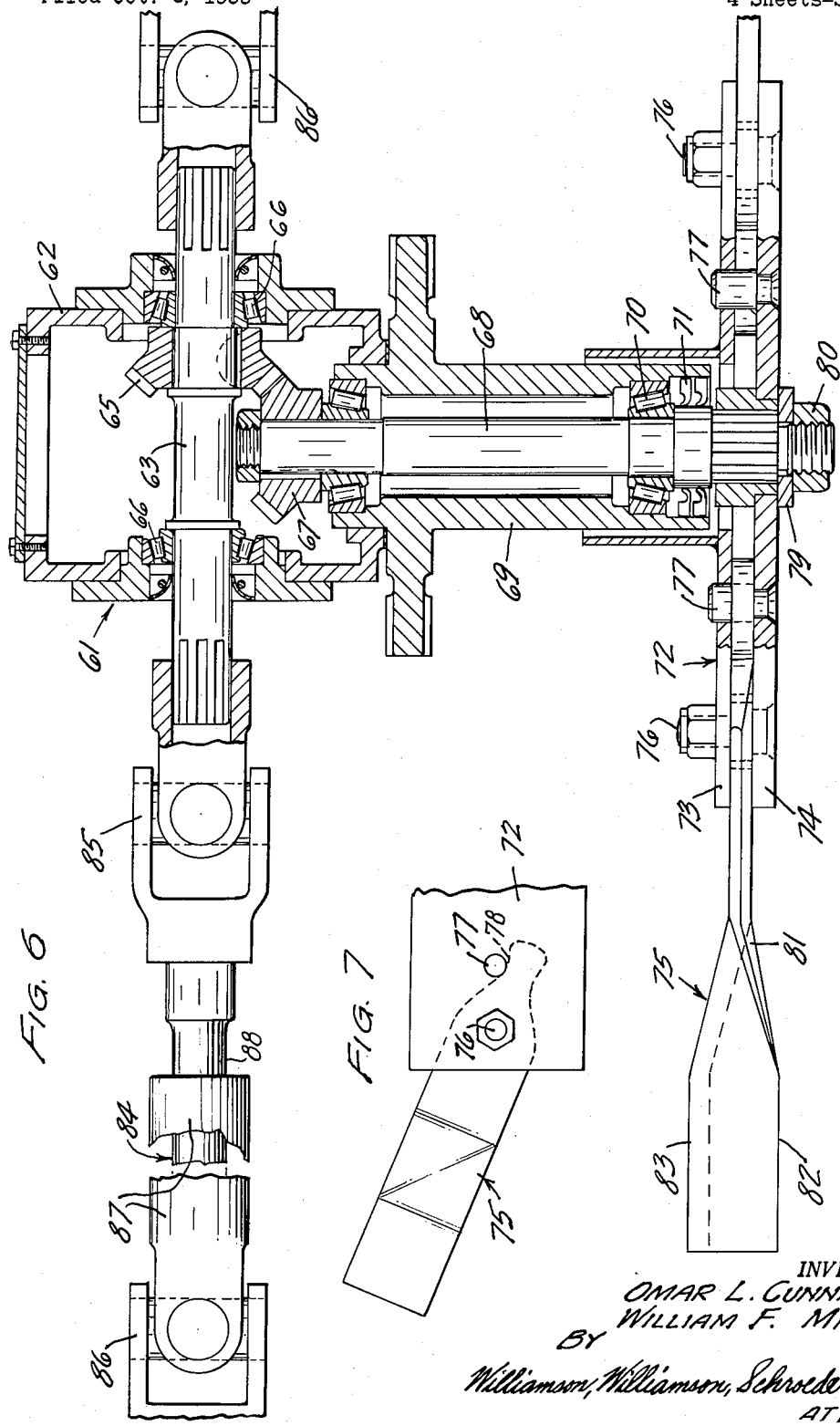

United States Patent Office 2,753,674
Patented July 10, 1956

2,753,674

GANG MOWER

Omar L. Cunningham, Jr., Minneapolis, Minn., and William F. Miller, Tucson, Ariz., assignors to Toro Manufacturing Corporation of Minnesota, Minneapolis, Minn., a corporation of Minnesota Application October 5, 1953, Serial No. 384,012

10 Claims. (Cl. 56—6)

This invention relates to grass mowers. More particularly, it relates to a plurality of grass mowers of the type utilizing cutting elements rotating rapidly in a horizontal plane about a vertical axis, the mowers being arranged in gang fashion to permit wide swaths of grass to be cut with a single mowing unit.

It is a general object of our invention to provide a novel and improved gang mower of simple construction and operation.

A more specific object is to provide a novel and improved gang mower consisting of a plurality of mowing assemblies utilizing cutting elements rotating rapidly in a horizontal plane and drawn and driven by a single source of power.

Another object is to provide a novel and improved gang mower consisting of a plurality of mowing assemblies utilizing cutting elements rotating rapidly in a horizontal plane and connected together in a novel manner to provide efficient mowing action despite irregular contours in the terrain to be mowed.

Another object is to provide a novel and improved gang mower unit consisting of a plurality of mowing assemblies utilizing cutting elements rotating rapidly in a horizontal plane and connected together in a novel manner to permit individual assemblies to be shifted to an elevated and non-operative position to facilitate passage of the entire unit through relatively narrow gateways and the like.

Another object is to provide an improved gang mower consisting of a plurality of mowing assemblies utilizing cutting elements rotating rapidly in a horizontal plane, the assemblies of which have novel and improved mechanism for adjusting the elevation thereof.

Another object is to provide an improved means of connecting a plurality of mowing assemblies in side-by-side relationship to form a gang mower so that the mowing assemblies may be of the type utilizing cutting elements rotating rapidly in a horizontal plane.

Another object is to provide an improved gang mower consisting of a plurality of mowing assemblies utilizing cutting elements rotating rapidly in a horizontal plane, the assemblies being connected together in a novel manner to permit the cutting elements thereof to be driven by a single source of power emanating from the vehicle utilized to draw the gang mower across the terrain to be mowed.

Another object is to provide an improved gang mower consisting of a plurality of mowing assemblies utilizing cutting elements rotating rapidly in a horizontal plane, the individual assemblies being connected together to permit the same to follow the contour of the terrain if irregular without the cutting elements thereof performing an inefficient job of mowing.

Another object is to provide an improved gang mower consisting in a plurality of mowing assemblies of the type utilizing cutting elements rotating rapidly in a horizontal plane, these assemblies having cutting elements of novel and improved construction to provide a more efficient cutting action.

Another object is to provide an improved gang mower of the type described having novel and improved mountings for its cutting elements which rotates in a horizontal plane about a vertical axis.

Another object is to provide an improved gang mower having a plurality of mowing assemblies utilizing cutting elements rotating rapidly in a horizontal plane about a vertical axis, these assemblies having their cutter elements drivably interconnected and the assemblies being connected together to permit relative vertical movement therebetween despite such driving connections.

Another object is to provide an improved gang mower consisting in a plurality of mowing assemblies having cutting elements rotating in a horizontal plane about a vertical axis, the assemblies being connected in such a manner as to permit the more lateral assemblies of the gang mower to move to a more central position without disassembly of the gang mower to facilitate transportation of the unit on highways and the like.

These and other objects and advantages of our invention will more fully appear from the following description made in connection with the accompanying drawings, wherein like reference characters refer to the same or similar parts throughout the several views, and in which:

Fig. 1 is a plan view of a gang mower constructed in accordance with our invention with the telescoping joints removed;

Fig. 2 is a side elevational view of the same;

Fig. 3 is a rear elevational view on an enlarged scale of part of the left-hand side and central sections of our gang mower with the shields removed showing the relative shifting movement of the mowing assemblies when on uneven terrain;

Fig. 6 is a detailed vertical sectional view on an enlarged scale taken through one of the gear boxes of one of the mower assemblies and looking forwardly;

Fig. 7 is a plan view on an enlarged scale of one of the knives and a portion of its knife holder; and Fig. 8 is a perspective view of one of the lateral mowing assemblies taken from the rear left-hand side and having its telescoping drive shaft and telescoping joint broken off.

Figure 4:
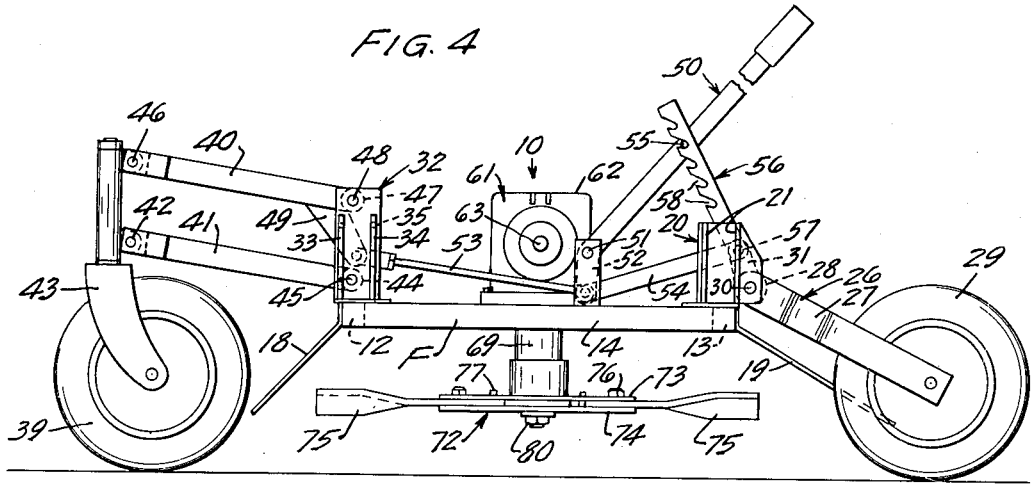
Fig. 4 is an end elevational view on an enlarged scale of one of the mowing assemblies with the depending apron or skirt removed to show the cutting elements.

One embodiment of our invention may include, as shown in Figs. 1–8, a gang mowing unit indicated generally as M comprised of a plurality of individual mowing assemblies indicated generally as 10 in combination with a larger or double mowing assembly indicated generally as 11 which, as shown, is positioned between a number of single mowing assemblies 10. These mowing assemblies 10 and 11 are arranged adjacently in aligned relation along a line substantially normal to the direction in which the unit travels, as can best be seen by reference to Fig. 1. When so arranged these assemblies 10 and 11 have adjacent sides which are pivotally connected together in a manner to be hereinafter described.

Each of the assemblies 10 is comprised of a rectangular metal frame indicated generally as F. This frame has a front bar 12, a rear bar 13, a left-hand side bar 14 and a right-hand side bar 15, considered in relation to the direction in which the unit M moves. Each of these frames F has a pair of parallel and spaced cross pieces 16 and 17 which are made of angle iron or some similarly rigid material and which extend transversely of the direction along which the unit M moves. As shown, they are positioned across the middle portion of the frame F. Extending downwardly from the front bar 12 of each frame F is a front shield 18. Extending diagonally downwardly from the rear bar 13 is a rear shield 19.

Figure 5:
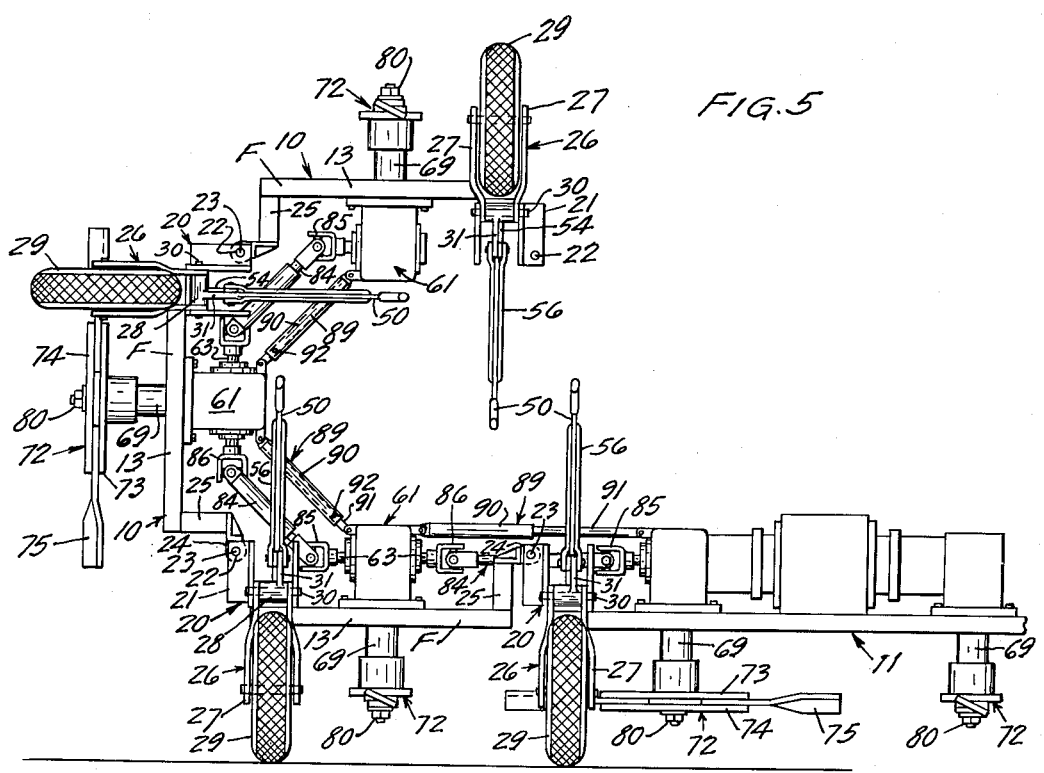
Fig. 5 is a rear elevational view comparable to Fig. 3 but with the more lateral assemblies thereof being shown in elevation, the view being of the left-hand side and central portions of the gang mower.

Extending upwardly from the rear corner of each of the assemblies 10 farthest from the central section 11 is a mounting bracket 20 which has laterally extending pivot plates 21 thereon one of which is more forward than the other and each of which has an aligned aperture 22 formed therein which is adapted to receive a pivot pin 23. This pivot pin 23 pivotally connects the bracket 20 to a laterally extending sleeve member 24 carried at the upper end of a pivot post 25 which is welded to the opposite rear corner of the adjacent mowing assembly 10. This pivot post 25 extends upwardly therefrom to a position opposite the pivot pin 23 as best shown in Fig. 5. In this manner, each of the frames F of the mowing assembly 10 is pivotally connected to the adjacent frame at their rearward corners.

At each rear corner of the frames F which is farthest from the central section 11, there is provided a forked member 26 having laterally spaced bars 27 supported at their inner ends by a sleeve 28 and carrying a wheel 29 rotatably mounted between their free and outer ends, as best shown in Figs. 2, 3 and 4. The sleeve 28 is pivotally mounted on the bracket 20 by way of a mounting pin 30 which permits the forked member 26 to pivot vertically therearound and around a horizontal axis. Each of the forked members 26 has an upstanding arm 31 to form with the remainder of the forked member what is essentially a bell crank. This can best be seen in Fig. 4.

Extending upwardly from each front corner of the frame F which is farthest from the central unit 11, is an upstanding rectangularly shaped mounting bracket 32. This mounting bracket 32 has laterally extending spaced plates 33 and 34 which have aligned apertures 35 adapted to receive a pivot pin therein similarly to the plates 21. These plates are utilized to pivotally connect the corner portions of adjacent frames 10 by a pivot pin 36 which extends through a sleeve member 37 welded to a pivot post 38 which in turn is welded to the front corner of the frame F closest to the central unit 11. It can be readily seen from the above that actually the entire unit M is comprised of a central section 11 and left and right-hand mowing assemblies 10, the lateral assemblies being constructed similarly but oppositely in certain respects to permit them to be used on the desired side of the central unit 11. This can be clearly seen through reference to Fig. 1.

Mounted on the mounting bracket 32 at the front corner of the frame F is a castored wheel 39 which is supported by a pair of vertically spaced horizontal and rearwardly extending support arms 40 and 41. The lower of these arms 41 is pivotally connected at 42 to the fork 43 within which the wheel 39 is mounted and carries a sleeve 44 at its inner end portion which is pivotally connected to the mounting bracket 32 by a pivot pin 45. The upper support arm 40 is pivotally connected to the fork 43 by a pin 46 at its outer end and carries a sleeve 47 at its inner end by which it is pivotally connected to the mounting bracket 32 by a pin 48. The sleeve 47 has a depending arm 49 which forms essentially a bell crank with the sleeve 47 and the support arm 40.

A bell crank type lever 50 is pivotally mounted by a pin 51 upon an upstanding bracket 52 which is mounted on the outer bar 14 of the frame F. The lower end portion of the lever 50 is pivotally connected by rigid links 53 and 54 to the arms 49 and 31 respectively. The lever 50 has a pair of laterally extending ears 55 on opposite sides thereof and it extends upwardly through an inverted U-shaped channel member 56 which is pivotally mounted upon the pin 57 which extends through the upper end portion of the arm 31. Thus the U-shaped channel member 56 is free to swing about the horizontal axis of the pin 57. The channel member 56 has a plurality of downwardly and rearwardly extending slots 58 which are adapted to receive the ears 55 therein to engage and retain the lever 50 in any one of a number of predetermined positions.

Each assembly 10 includes a cutting mechanism indicated generally as 61, as best shown in Fig. 6. Each of the cutting mechanisms 61 includes a gear box 62 having a horizontal shaft 63 extending therethrough transversely of the direction of movement of the entire gang mower. This shaft 63 carries a bevel gear 65 cooperating with a bevel gear 67. The shaft 63 is journaled at each side of the gear box 62 in a pair of opposed bearings 66 and extends outwardly from each side of the gear box. The gear box 62 is fixedly mounted upon the cross pieces 16 and 17. The bevel gear 67 is mounted upon the upper end portion of and drives a vertically extending shaft 68 which extends downwardly to a position adjacent the ground. The shaft 68 is journaled within a sleeve 69 which is filled with oil and is carried in depending relation by the gear box 62. The lower end portion of the shaft 68 is journaled in a tapered bearing 70 and is surrounded with a double oil-seal packing 71 to retain the oil within the sleeve 69.

The lower end of the shaft 68 is splined to a knife holder indicated generally as 72. This knife holder 72 is comprised of a pair of vertically spaced bars 73 and 74 which extend outwardly from opposite sides of the lower end portion of the shaft 68 and carry at each of their ends a knife indicated generally as 75. These knives 75 are pivotally mounted between the free end portions of the bars 73 and 74 upon a bolt 76. A stop member in the form of a pin 77 extends between the bars 73 and 74 at a point inwardly of the bolt 76 and substantially along a line extending between the axis of pivot of the bolt 76 and the axis of the shaft 68. The inner end of the blade extends inwardly sufficiently far to abut against the stop member and has recesses 78 formed therein to receive the same, as best shown in Fig. 7. The knife holder 72 is secured to the lower end of the shaft 68 by a washer 79 and a nut 80.

The knife 75 is formed by preparing a rectangular sheet of metal which is subsequently twisted at its medial area as at 81 and has both of the side edges of its outer end portion sharpened to provide cutting edges. The blade is thus provided with a leading edge 82 and a trailing edge 83, the latter being above the general plane of the knife. The trailing edge 83 thus creates an upwardly directed air current which serves to lift the grass to an erect position to facilitate efficient cutting of the same by the leading edge 82. In view of the fact that both the leading and trailing edges 82 and 83 are sharpened, the blade can be readily inverted so that the leading edge 82 will become the trailing edge and the trailing edge 83 will become the leading edge.

The knife 75 when rotated by the knife holder 72 is swung outwardly by centrifugal force and attempts to align itself with the longitudinal center of the knife holder. The pin or stop member 77, however, prohibits the knife from swinging to a position where it will be aligned with the knife holder and it can only swing to the hanging back or trailing position shown in Fig. 7.

Each end of the horizontal shaft 63 is splined to one end of a telescoping universal drive shaft indicated generally as 84. The shaft 63 is connected to the universal drive shaft 84 by universal joint 85. The opposite end of the universal drive shaft 84 is connected by universal joint 86 to the opposite end of the shaft 63 of the adjacent asesmbly 10. This can clearly be seen in Figs. 1 and 5. The telescoping universal drive shaft 84 includes a tube 87 having an internal diameter equal to the external diameter of the shaft member 88 which telescopes therewithin. The tube 87 and the shaft 88 are splined to each other to preclude relative rotation about their longitudinal axes. It will be noted that the horizontal shaft 63 is on substantially the same horizontal plane as the axis of pivot of the assembly 10 which pivots about the axis of the pins 23.

Pivotally connected to the adjacent corners of the adjacent pairs of gear boxes 61 as best shown in Fig. 5, is a telescoping joint 89 which has a spring loaded locking pin of conventional construction to lock the joint in telescoped position as shown in Fig. 5. The telescoping joint is comprised of a hollow cylinder 90 and a shaft 91 which telescopes therewithin, the cylinder 90 carrying the locking pin 92 which is spring-loaded to adapt the same to slip into an aperture provided therefor in the shaft 91.

The central unit 11, as best shown in Fig. 1, is comprised of a rectangularly shaped frame 93. This frame is twice as long as one of the frames F of the assemblies 10 and has a front bar 94, a rear bar 95, a left side bar 96 and a right side bar 97. Two pairs of laterally spaced cross pieces 98 and 99 extend parallel to the direction of movement of the gang mover and are fixedly secured to and extend between the front and rear bars 95 and 94. This central unit 11 has mounted on each of the two pairs of cross pieces 98 and 99 a cutting mechanism constructed substantially identically with the cutting mechanism shown in Fig. 6 and are indicated as 100 and 101. Each has a drive shaft 102 and 103 extending outwardly therefrom and drivably connected with one of the universal joints of the telescoping drive shaft 84 of the adjacent assembly 10. These shafts 102 and 103 extend inwardly into the main bevel gear (not shown) of conventional construction which is encased in the main gear housing 104. Journal structure of unusually heavy gauge supports the main gear casing 104 between the gear boxes 100 and 101 and is indicated as 105 and 106.

The central unit 11 is provided with wheel structure at each of its sides constructed identically with the wheel structure at the outer side of each of the assemblies 10 and is provided with the same adjustment mechanism shown in Fig. 4 to enable the elevation of the unit to be adjusted relative to the elevation of the ground in the same manner that the other assemblies 10 are adjusted.

Extending forwardly from the main bevel gear (not shown) and from the main gear casing 104 is a shaft 107. This shaft is drivably connected to a speed-up gear (not shown) within its casing 108. This speed-up gear is of conventional type which is well-known in the art and need not be further described. Extending forwardly from the speed-up gear 107 is another shaft 109 which in turn is drivably connected by a universal joint 110 to a telescoping drive shaft 111 the outer sleeve member 112 of which is keyed to a shaft 113 of smaller diameter. The sleeve member 112 is drivably connected by a universal joint 114 to a drive shaft 115 which in turn is connected by a universal joint 116 to the power-take-off 117 of the tractor T which is utilized to draw the gang mower across the terrain. A tow bar 118 of the tractor T is connected with tongue structure 119 of the gang mower, as best shown in Fig. 2, which in turn is connected to the cross pieces 98 and 99 as best shown in Fig. 1. A support bracket 120 as shown in Fig. 2, extends upwardly from the tongue structure 119 and carries a pivotally mounted plate 121 through which the telescoping drive shaft 111 extends.

The knives 75 are synchronized and overlapping. In other words, the gear arrangement is such that each knife 75 will never engage any blade of the adjacent unit and the knives and the knife holders are of sufficient length so that they overlap each other during the orbit of travel of the same.

The normal operation of our gang mower is believed to be quite self-evident. The power-take-off 117 of the tractor T drives the various cutting mechanisms as a result of the transmission of power through the drive shaft 115, the telescoping drive shaft 112, the speed-up gear 108 and the bevel gears within the main gear box 104 and the smaller gear boxes 100, 101 and 62. In this manner, the knives 75 are driven at a high rate of speed about the vertical axis of the vertical shaft 68 so as to swing outwardly from its knife holder as far as possible. The pin or stop member 77 prevents the knives 75 from moving to an aligned position relative to the knife holder 72 and thus the knife is always in the trailing position shown in Fig. 7 relative to the knife holder. Because of this trailing position, a slicing action is effected upon the grass so that less power is required to cut the same. In addition, there is less danger of serious damage resulting to the knife 75 if a stone or other serious obstruction is encountered, for in that event, because the knife is in over-dead-center relation, it will more easily be swung back to an out-of-way and non-engaging position relative to the obstruction.

Because the blades 75 are overlapped and synchronized, there is no possibility of grass being missed while a corner is being negotiated with our gang mower regardless of how sharply the machine is turned. In addition, it has the added advantage that the grass will be cut efficiently without leaving any of the same despite the existence of an uneven contour of the land to be mowed. This can best be realized through reference to Fig. 3 wherein one of the mower assemblies 10 has moved to an angulated position relative to the remaining assemblies in order to conform to the uneven contour of the land. The overlap of the blades 75, as can be clearly seen by Fig. 3, insures that no grass will remain standing despite the fact that the one assembly tilts to conform to the contour of the land. The pivotal connections between the assemblies about the pins 23 and 36 permits the assemblies to pivot relative to each other about a horizontal axis extending in the direction of movement of the machine. The pivotal movement is permitted by the pivot post 25 swinging between the plates 21 and 22 of the bracket 20 and the opposite side of the assembly swinging away from its adjacent assembly as clearly shown at the left-hand side of the inclined assembly in Fig. 3. Such pivotal movement causes the telescoping drive shaft on the left-hand side of the inclined assembly shown in Fig. 3 to telescope to an inclined position and causes the telescoping drive shaft on the right-hand side thereof to extend, as can be clearly seen from the figure. The outermost assembly shown to the left in that figure, it will be noted, is still traveling along a horizontal plane and is being driven by the universal drive shafts connecting the same to the inclined assembly at the same speed as the knives on the other assemblies.

When it is desired to adjust the elevation of the knives 75 of the assembly 10 and 11, such adjustment can be readily effected through movement of the lever 50 relative to the U-shaped channel member 56. By moving the lever 50 forwardly, the ears 55 will disengage the slots 58 and the U-shaped channel member 56 can be moved upwardly and then slid to a new position where the ears 55 will be re-engage the desired slot. Forward movement of the lever 50 causes the link 53 to draw the arm 49 rearwardly and thus cause the wheel 39 to move downwardly to elevate the forward part of the assembly. At the same time the link 54 will be caused by the lever 50 to move rearwardly and swing the arm 31 rearwardly about the pin 30 to cause the wheel 29 to also move downwardly. Thus it can be readily seen that the wheels 29 and 39 are moved simultaneously in the same direction relative to the frame F so that the elevation of the entire assembly 10 relative to the ground can be readily and simultaneously adjusted through a single movement of the lever 50.

When the tractor T goes over a knoll or starts up a steep incline, the telescoping drive shaft 111 must either extend or contract as the needs may be and pivot with the pivotally mounted plate 121. Thus it matters not whether the terrain be level for provision is made for the machine to be drawn over uneven contour.

It will be noted that the knives 75 may be readily removed, inverted and reinserted in the knife holder 72 for further use. When this takes place, the edge which was formerly the leading edge of the outer end portion of the knife becomes the trailing edge and creates the upwardly directed air current to cause the grass to remain erect in the path of a following knife 75.

It should also be noted that it is possible with our invention to use as many assemblies 10 as desired at either side of the central assembly 11. It is a simple matter to add or subtract one or more assembly 10 to either side of the machine since all that is required are the pivotal connections at the corners of the frames F and the connections between the telescoping drive shafts and the telescoping joints which extend between the respective assemblies.

When desired, one or more of the outermost assemblies 10 can be moved to an elevated and if desired an overhanging position. This can best be seen through reference to Fig. 5. To accomplish this, the outermost assembly 10 is seized by the outer bar of the frame F and lifted to a vertical position. When this is done, the telescoping drive shaft will move to a contracted position and the telescoping joint will do likewise. The spring loaded lock 92 will then slip into the aperture provided in the shaft 91 and lock the entire outer assembly 10 in a position normal to its adjacent assembly. If it is desired to further narrow the overall width of the machine, the assembly 10 second from the outer side can similarly be moved to a vertical position relative to its adjacent inwardly positioned assembly 10 so that the relative positions shown in Fig. 5 will be attained. As shown, the outermost assembly 10 will then be in an inverted position and overhanging the more central assembly of the machine. As shown, the telescoping joint 89 of this second assembly 10 will lock when its assembly is moved to vertical position so that henceforth the machine may be drawn through a narrow passage or gate or down a highway without endangering traffic or requiring disassembly of the machine.

To return the machine to usable position from the position shown in Fig. 5, it is a simple matter to release the spring lock pin 92 and tilt the vertical frame shown back to a horizontal position, whereupon the assembly shown invertedly will return to vertical position. The outermost assembly 10 is then unlocked and swung downwardly to horizontal position whereupon the entire gang mower is again ready for use. Thus it can be seen that it is a simple matter to condition our gang mower so as to permit its ready transportation along highways and through narrow passageways and to thereafter return it to usable form.

It should also be noted that each of the telescoping universal drive shafts 84 extends in substantially the same horizontal plane as the axis of pivot of the assemblies 10 which is the axis of the pins 23. This is important because it permits the maximum relative tilting arrangement between the adjacent assemblies 10, for it is possible when the axis of pivot is in the same plane as the drive shaft to tilt the assemblies relative to each other a maximum amount without causing the telescoping portions of the drive shaft to disengage or to abut the inner end of the shaft member 88 against the inner end of the tube 87, thereby preventing further relative tilting movement.

Thus it can be seen that we have provided a novel arrangement of parts which makes it possible to utilize a plurality of mowing assemblies utilizing cutting elements rotating in a horizontal plane about a vertical axis within a gang mower. It is believed that heretofore no one has conceived of a manner of connecting a plurality of such assemblies in order to provide a gang mower which will do an efficient job of cutting the grass despite the fact that the terrain has an uneven contour.

It will, of course, be understood that various changes may be made in the form, details, arrangement and proportions of the various parts without departing from the scope of our invention.

What is claimed is:

1. A gang mower having in combination a plurality of rectangularly shaped and horizontally extending rigid frames arranged adjacently along a substantially straight line, each adjacent pair of said frames having adjacent sides, wheel structure mounted on said frames and supporting the same for movement across the ground, a vertically extending shaft mounted on each of said frames for rotation about its longitudinal axis and extending downwardly therefrom to a position adjacent the ground, a telescoping drive shaft extending between said shafts of the adjacent frames and connecting the same in universal driving relation to rotatably drive the same, mechanism for connecting one of said vertical shafts with a source of rotary power, cutter mechanism carried by the lower end portions of said vertical shafts and rotatable therewith in a substantially horizontal plane, the adjacent sides of said frames being swingably connected for vertical movement of one of said frames relative to the other, at least one of said frames being movable from a horizontal position to a substantially vertical position.

2. A gang mower having in combination a plurality of rectangularly shaped and horizontally extending rigid frames arranged adjacently along a substantially straight line, each adjacent pair of said frames having adjacent sides, wheel structure mounted on said frames and supporting the same for movement across the ground, a vertically extending shaft rotatably mounted on each of said frames for rotation about its longitudinal axis and extending downwardly therefrom to a position adjacent the ground, a telescoping drive shaft normally extending horizontally between the shafts of said adjacent frames and connecting the same in universal driving relation to rotatably drive the same simultaneously, mechanism for connecting one of said vertical shafts with a source of rotary power, cutter mechanism carried by the lower end portions of said vertical shafts and rotatable therewith in a substantially horizontal plane, the adjacent sides of said frames being pivotably connected for pivotal relative movement about a substantially horizontal axis extending transversely of the straight line along which said frames are arranged, the axis of such pivotal movement being in substantially the same horizontal plane as the axis of said telescoping drive shaft.

3. A gang mower having in combination a plurality of rectangularly shaped and substantially horizontally extending rigid frames arranged adjacently along a straight line, each adjacent pair of said frames having adjacent sides, wheel structure mounted on said frames and supporting the same for movement across the ground, a vertically extending shaft rotatably mounted on each of said frames for rotation about its longitudinal axis and extending downwardly therefrom to a position adjacent the ground, a telescoping drive shaft extending between the shafts of the adjacent frames and connecting the same in universal driving relation to rotatably drive the same, mechanism for connecting one of said vertical shafts with a source of rotary power, cutter mechanism carried by the lower end portions of said vertical shafts and rotatable therewith in a substantially horizontal plane, said cutter mechanism including a plurality of mower knives overlapping each other and synchronized in their rotation relative to each other, the adjacent sides of said frames being swingably connected for vertical movement of one of said frames relative to the other.

4. A gang mower having in combination a plurality of rectangularly shaped and substantially horizontally extending rigid frames arranged adjacently along a substantially straight line, each pair of said frames having adjacent sides, wheel structure mounted on said frames and supporting the same for movement across the ground, a vertically extending shaft mounted on each of said frames for rotation about its longitudinal axis and extending downwardly therefrom to a position adjacent the ground, a telescoping drive shaft extending between the shafts of said adjacent frames and connecting the same in universal driving relation to rotatably drive the same, mechanism for connecting one of said vertical shafts with a source of rotary power, cutter mechanism carried by the lower end portions of said vertical shafts and rotatable therewith in a substantially horizontal plane, said cutter mechanism including a knife holder mounted on the lower end portion of each of said shafts, and a mower knife having an outer end portion, an inner end portion and a medial portion, and being pivotally mounted by its inner end portion on said knife holder, said knife having a sharpened leading edge and a trailing edge and being twisted at its medial portion causing said sharpened leading edge to extend at a lower elevation than said trailing edge, the adjacent sides of said frames being swingably connected for vertical movement of one of said frames relative to the other.

5. A gang mower having in combination a plurality of mowing assemblies, each of said assemblies being comprised of a rectangularly shaped and horizontally extending rigid frame arranged adjacently to a similar frame of an adjacent assembly and along a substantially straight line, each adjacent pair of said frames and said assemblies having adjacent sides, wheel structure mounted on said frame and supporting the same for movement across the ground, a vertically extending shaft mounted on each of said frames for rotation about its longitudinal axis and extending downwardly therefrom to a position adjacent the ground, and cutter mechanism carried by the lower end portions of each of said vertical shafts and rotatable therewith in a substantially horizontal plane; a telescoping universal drive shaft extending between said shafts of the adjacent assemblies and connecting the same in universal driving relation to rotatably drive the same; mechanism for connecting one of said vertical shafts with a source of rotary power; the adjacent sides of said frames of each of said assemblies being swingably connected for vertical movement of one of said assemblies relative to the other; a telescoping joint extending between each adjacent pair of said assemblies, and locking mechanism carried by each of said telescoping joints for locking its telescoping parts relative to each other in predetermined relative position to lock one of said assemblies in substantially vertical position while the assembly connected thereto by said joint remains substantially horizontal.

6. A gang mower having in combination a plurality of mowing assemblies arranged adjacently along a substantially straight line, each adjacent pair of said assemblies having adjacent sides, each of said assemblies including a rigid frame, wheel structure mounted on said frame and supporting the same for movement across the ground, a vertically extending shaft mounted on said frame for rotation about its longitudinal axis and extending downwardly therefrom to a position adjacent the ground, and cutter mechanism carried by the lower end portion of said shaft and rotatable therewith in a substantially horizontal plane; a telescoping drive shaft extending between the shafts of each adjacent pair of said assemblies and connecting the same in universal driving relation to rotatably drive the shafts thereof; mechanism for connecting one of said vertical shafts of said assemblies with a source of rotary power; mechanism swingably connecting the adjacent sides of said assemblies with each other for swinging movement in a vertical plane relative to each other; a tractor hitchable to said assemblies to draw the same as a unit across the ground, said tractor having a power-take-off; a sectional drive shaft unit having forward and rearward portions and extending between said power-take-off of said tractor and one of said drive shafts and drivably connecting the same, said sectional drive shaft unit including a universal joint connecting the remainder of said unit with said power-take-off, and including a universal joint connecting said forward section with said rearward section of said main drive shaft, and including a universal joint connecting said rearward section with one of said vertical shafts; and support structure pivotally supporting one of said sections of said main shaft unit.

7. A gang mower having in combination a plurality of generally horizontally extending rigid frames arranged adjacently along a substantially straight line, the adjacent pairs of said frames having adjacent sides, wheel structure mounted on said frames and supporting the same for movement across the ground, a plurality of vertically extending shafts mounted on said frames for rotation about their longitudinal axes and extending downwardly therefrom to a position adjacent the ground, said shafts being spaced along said line, a telescoping drive shaft extending between the shafts of the adjacent frames and connecting the same in universal driving relation to rotatably drive the same, mechanism for connecting one of said vertical shafts with a source of rotary power, cutter mechanism carried by the lower end portions of said vertical shafts and rotatable therewith in a generally horizontal plane, the adjacent sides of said frames being swingably connected for vertical movement of one of said frames relative to the other about an axis extending transversely of said line.

8. The structure defined in claim 7, at least one of said frames being swingable from a substantially horizontal position to a substantially vertical position.

9. The structure defined in claim 7, at least one of said frames being swingable to an inverted overhanging vertically spaced position relative to another of said frames.

10. The structure defined in claim 7, at least one of said frames being swingable to an inverted vertically spaced overhanging position relative to a non-adjacent frame, said inverted frame being supported in this position by its adjacent frame, said latter frame extending normally to said inverted frame when in such position.

References Cited in the file of this patent

UNITED STATES PATENTS

| | | |
|---|---|---|
| 2,150,350 | Vargas | Mar. 14, 1939 |
| 2,484,511 | Ingalls | Oct. 11, 1949 |
| 2,577,885 | Gay | Dec. 11, 1951 |
| 2,603,050 | Scheer | July 15, 1952 |
| 2,627,156 | Carter | Feb. 3, 1953 |
| 2,653,827 | Manning | Sept. 29, 1953 |